Nov. 1, 1932.  A. A. KRAMER  1,886,196
TANK VEHICLE
Filed April 15, 1929   5 Sheets-Sheet 1

INVENTOR.
Andrew A. Kramer.
BY Alfred R. Fuchs
ATTORNEY.

Nov. 1, 1932.  A. A. KRAMER  1,886,196
TANK VEHICLE
Filed April 15, 1929  5 Sheets-Sheet 2
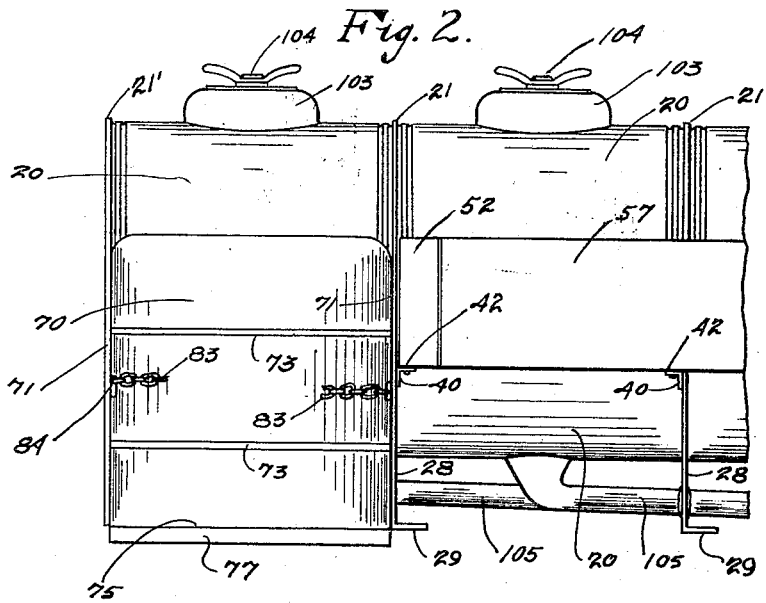
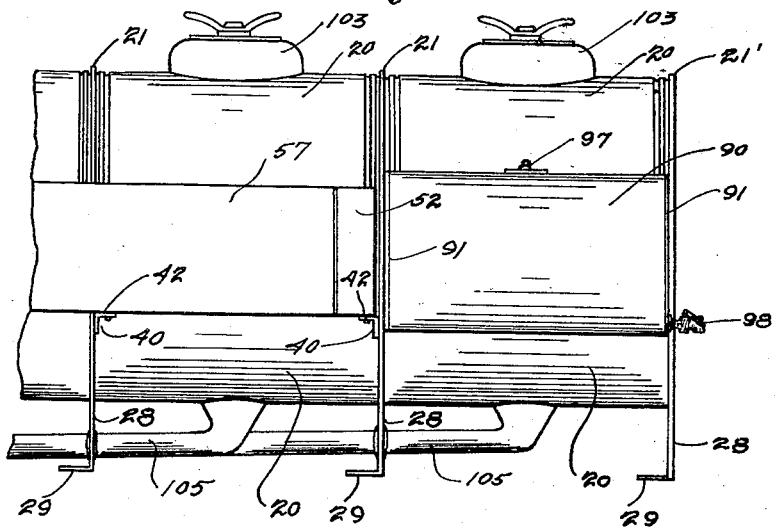
INVENTOR.
Andrew A. Kramer.
BY
Alfred R. Fuchs.
ATTORNEY.

Nov. 1, 1932.   A. A. KRAMER   1,886,196
TANK VEHICLE
Filed April 15, 1929   5 Sheets-Sheet 3
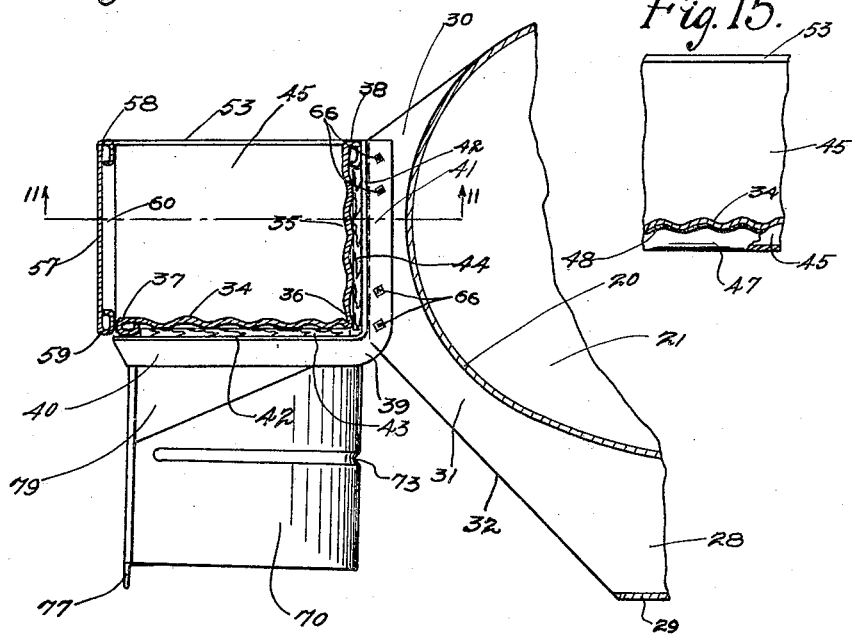
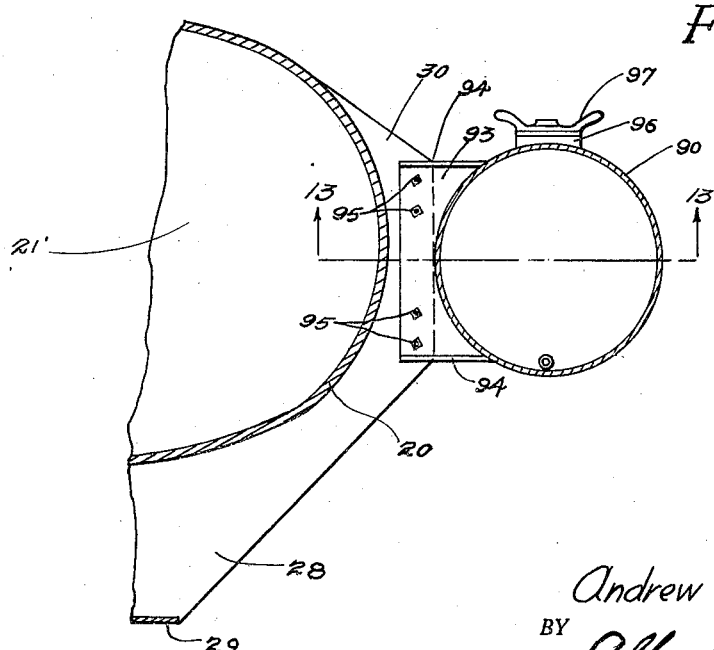
INVENTOR.
Andrew A. Kramer.
BY Alfred R. Fuchs,
ATTORNEY.

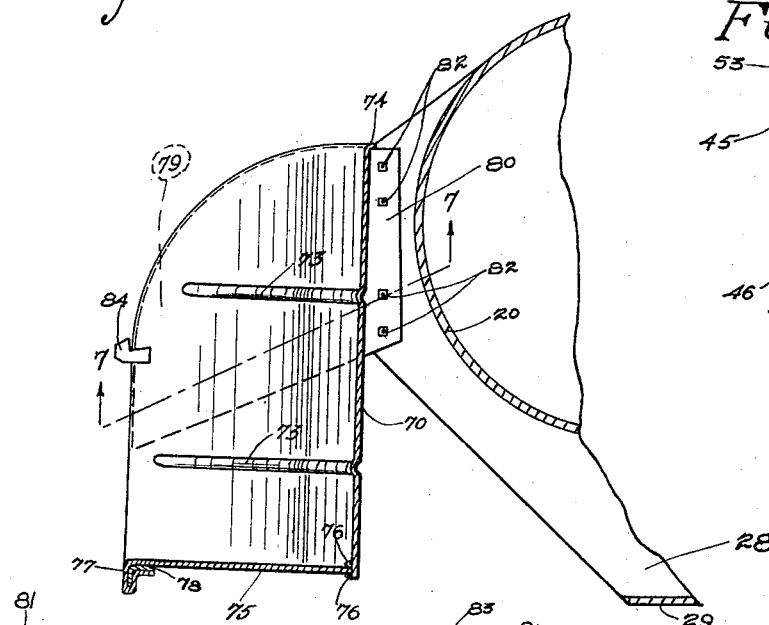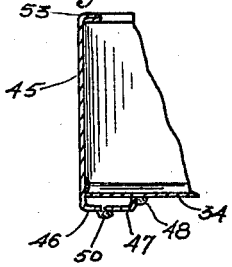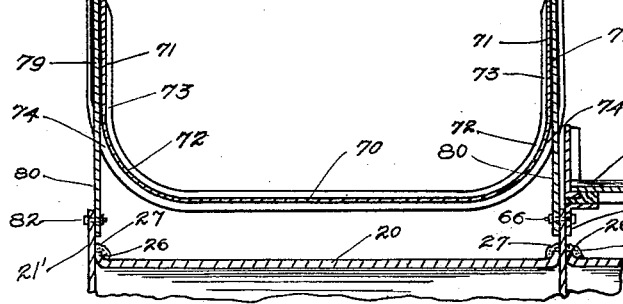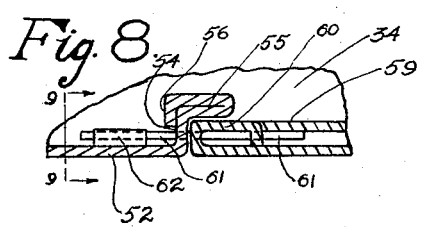

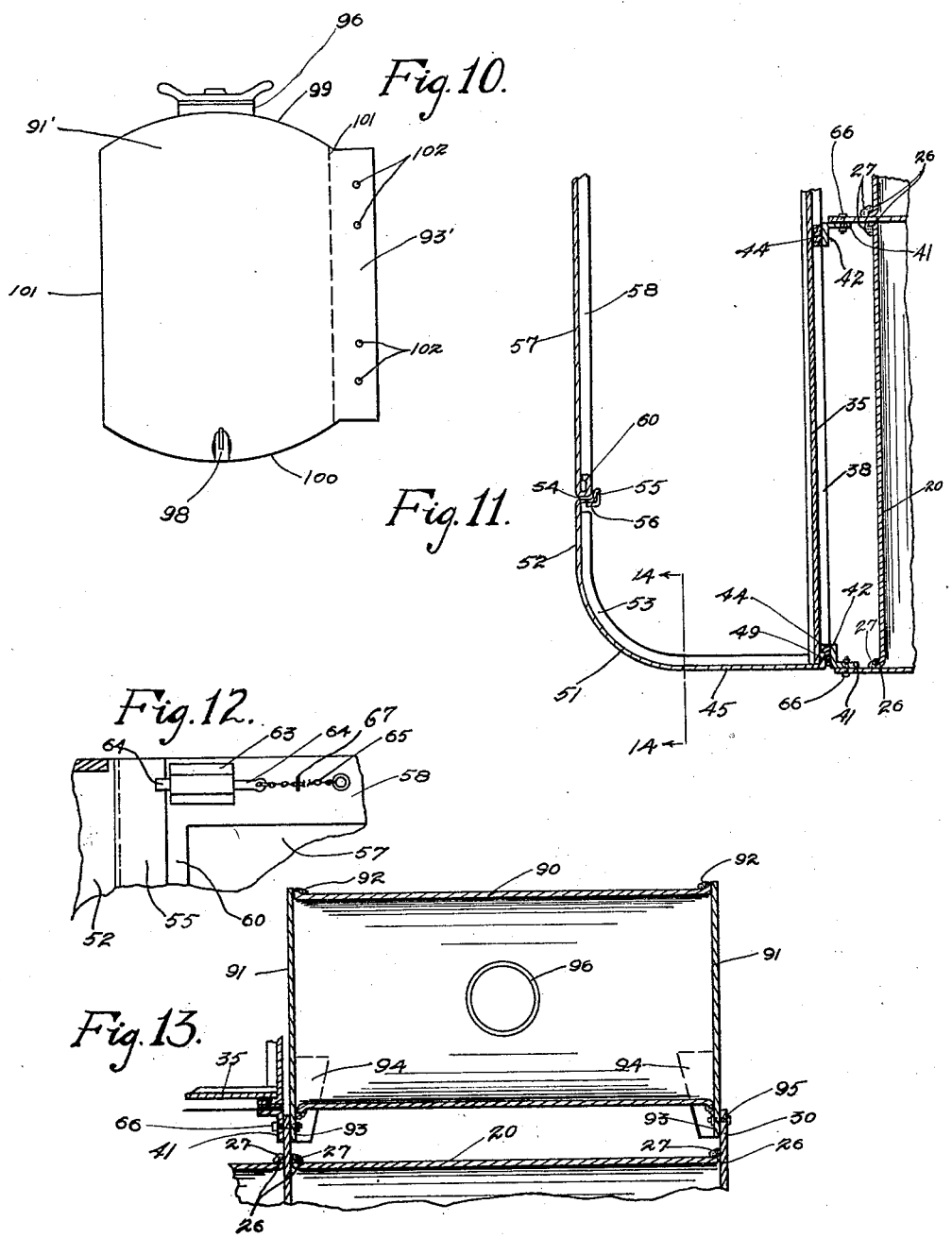

Patented Nov. 1, 1932

1,886,196

UNITED STATES PATENT OFFICE

ANDREW A. KRAMER, OF KANSAS CITY, MISSOURI

TANK VEHICLE

Application filed April 15, 1929. Serial No. 355,154.

My invention relates to tank vehicles, and more particularly to a tank vehicle adapted for use in the delivery of petroleum products.

In a tank vehicle of the character referred to above it is very desirable to have a main tank portion, which may be divided into a plurality of compartments, the compartments being usually used for the transportation of gasoline, and to have supplemental carrying devices thereon for carrying other petroleum products in smaller quantities. It is a purpose of my invention to provide new and improved means for carrying such smaller quantities of these petroleum products and new and improved means for mounting the said carrying means on the main tank portion.

In general, it is the purpose of this invention to utilize the transverse sheets, forming the partitions and end sheets of the main tank portion, for supporting the supplemental carrying means for the smaller quantites of petroleum products referred to above. Such products are carried usually in cans, or in barrels and in the present case, a small supplemental tank for this purpose is also provided.

More specifically, it is a purpose of my invention to provide a new and improved can rack and new and improved means for mounting the same on a tank vehicle; a new and improved barrel carrier and new and improved means for mounting the same on a tank vehicle; and, in addition, new and improved means for mounting a supplemental tank for lubricating oil on a tank vehicle. Furthermore, it is a purpose of my invention to provide such means for mounting the above mentioned devices on a tank vehicle that any arrangement or combination thereof to suit the convenience of the vehicle tank user may be mounted on the vehicle, and said means is preferably so constructed, that certain of such devices may be detached from the vehicle tank and others substituted therefor.

It is a purpose of my invention to provide a new and improved can rack construction, whereby an all metal can rack made out of a small number of parts is provided, and whereby a can rack may be provided that is detachable from the vehicle tank with which the same is associated, and which may be made in sections co-extensive with the tank, or of less length than the tank, so that some other device such as the lubricant tank or the barrel carrier may be substituted for a section thereof, if desired. The can rack is preferably provided with a one piece main body portion forming the bottom and rear wall thereof, which is corrugated so as to stiffen the same lengthwise thereof.

It is another object of the invention to provide a new and improved barrel carrier, so constructed as to be detachable from the tank vehicle and that is so constructed as to be neat in appearance and to provide for the convenient placing of a barrel in position therein or removal of the barrel therefrom.

It is a further purpose of my invention to provide a new and improved tank construction for vehicles, comprising a main tank and a supplemental tank located at one side of the main tank and to provide new and improved means for mounting said supplemental tank in position. Said means is constructed so as to mount the supplemental tank directly on the main tank so that the same are directly connected together, and so that a simple, rigid and strong supporting means is provided for said supplemental tank. The main tank is provided with transverse sheets forming dividing and end walls for the same, and the supplemental tank is provided with similar transverse sheets. It is a purpose of my invention to provide said sheets on said main and supplemental tank portions with extensions which are connected together in such a manner as to detachably mount said supplemental tank on said main tank.

Other objects and advantages of my invention will appear as the description of the drawings proceeds. I desire to have it understood, however, that I do not intend to limit myself to the particular details of structure shown or described, but that I intend to include, as part of my invention, all such obvious changes and modifications as would occur to a person skilled in this art, and as would fall within the scope of the claims.

In the drawings:

Fig. 2 is a fragmentary side elevation thereof, as viewed from the left side of Fig. 1.

Fig. 3 is a similar view as viewed from the right side thereof.

Fig. 4 is a fragmentary section taken on the line 4—4 of Fig. 1, on an enlarged scale.

Fig. 5 is a similar view taken on the line 5—5 of Fig. 1.

Fig. 6 is a similar view to Fig. 4 taken on the line 6—6 of Fig. 1.

Fig. 7 is a section taken substantially on the line 7—7 of Fig. 6.

Fig. 8 is an enlarged detail sectional view through a portion of the can rack and the adjoining portion of the can rack front wall, showing the hinge for said door.

Fig. 9 is a section taken on the line 9—9 of Fig. 8.

Fig. 10 is an end view of a modified form of lubricant tank.

Fig. 11 is a fragmentary horizontal section through the can rack and adjoining portion of the tank, taken substantially on the line 11—11 of Fig. 4.

Fig. 12 is a fragmentary inside face view of a portion of the can rack looking toward the door on the same.

Fig. 13 is a fragmentary horizontal section through the supplemental lubricant tank and the adjoining portion of the main tank, said section being taken substantially on the line 13—13 of Fig. 5.

Fig. 14 is a fragmentary section taken on the line 14—14 of Fig. 11.

Fig. 15 is a fragmentary section taken at right angles to Fig. 14.

Figure 1:
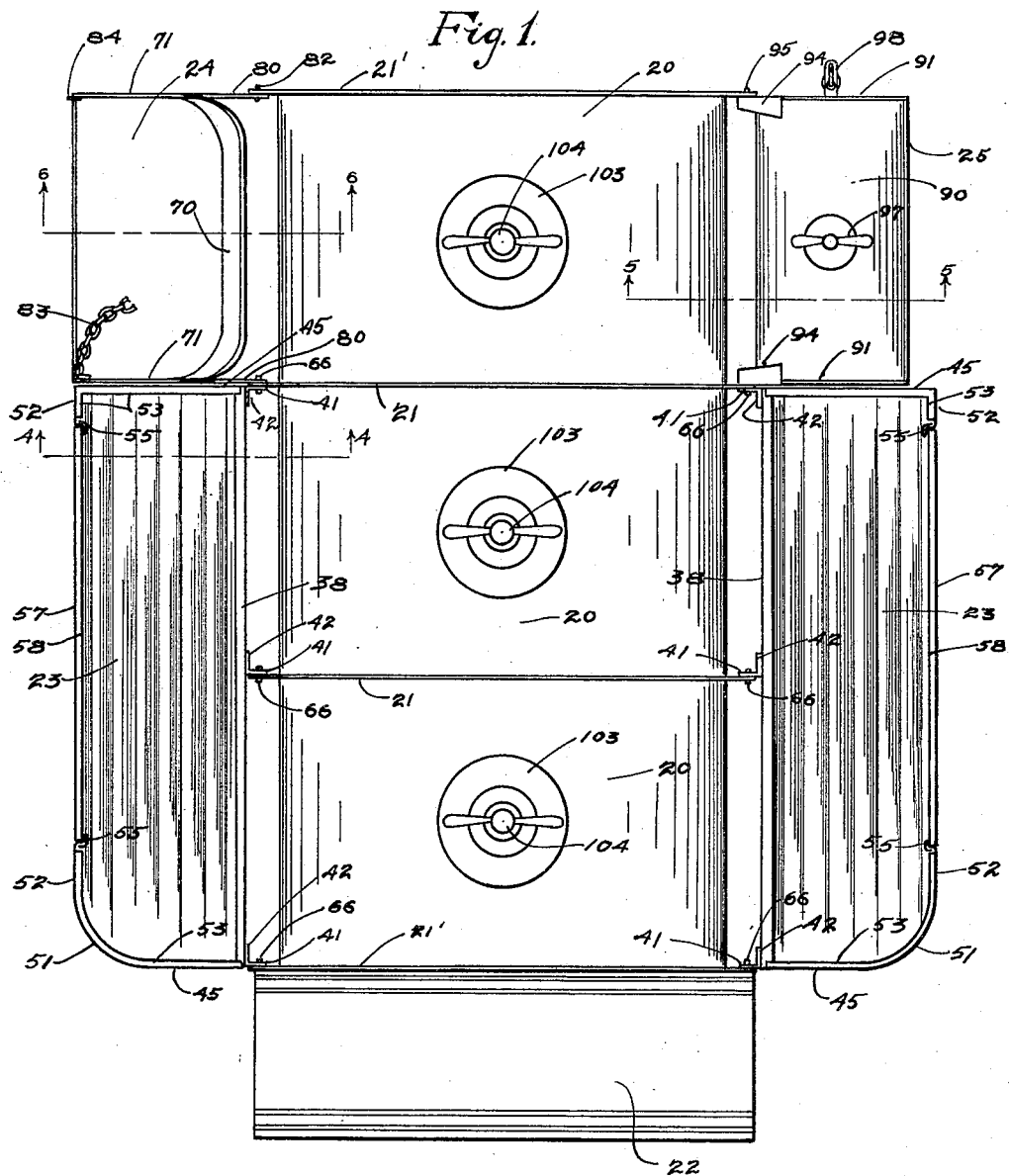
Fig. 1 is a top plan view of one form of my improved vehicle tank.

Referring in detail to the drawings, in Fig. 1 is shown a tank for vehicles comprising a main tank portion having the shell portions 20 and the transverse sheets 21 and 21', the sheets 21 being partition sheets and the sheets 21' being head forming sheets, or end sheets. A can box 22 is provided on the rear end of the main tank, and can racks 23 may be provided on the sides thereof. In the arrangement shown a barrel carrier 24 is also provided on one side of the main tank, and a supplemental tank 25 is provided on the other side of the main tank. The size of the various apparatus mounted on the sides of the main tank may be varied, of course, and the arrangement thereof may also be varied, if desired, as will be apparent as the description of the drawings proceeds.

The can racks are preferably made in sections corresponding in length to one or more of the sections of the main tank portion so as to fit between the transverse sheets 21, 21', and the barrel carrier and the supplemental tank are also made of a size such as to fit between said transverse sheets. The shell portions 20 are of a curved form, being preferably curved convexly so as to be substantially elliptical in transverse section, with the longer axis thereof extending substantially horizontally, as will be evident from Figs. 1, 4, 5, and 6. The transverse sheets extend outwardly beyond the shell portions of the tank, and said shell portions 20 may have outwardly flanged portions 26 thereon, (see Figs. 7, 11, and 13), which are welded to the transverse sheets 21, 21', at 27. Said transverse sheets extend only slightly beyond the shell of the main tank portion on the upper portion thereof, for forming the joint between the said sheets and the shell portions, but said sheets are provided with depending supporting extensions or bolster forming portions 28 which support the tank and the apparatus mounted thereon, on the vehicle frame. Preferably said depending supporting extensions on the transverse sheets are provided with flanges 29 on the bottoms thereof.

Said transverse sheets 21 and 21' are further provided with lateral extensions or wings 30 at each side thereof, extending outwardly a substantial distance from the shell portions of the main tank. The lateral extensions 30 and the depending extensions 28 are preferably integrally joined externally of the shell 20 by means of connecting portions 31, which may be provided with obliquely inclined edge portions 32. The top edges of the lateral extensions 30, may also be inclined, as shown at 33, if desired. These lateral extensions or wing portions 30 on the transverse sheets 21 and 21' are utilized for mounting the can racks, barrel carrier and supplemental tank on the main tank portion, as will be described below.

The can rack is shown more in detail in Figs. 4, 8, 9, and 11 to 15, and comprises a one piece bottom and back forming portion, having the horizontally extending portion 34 forming the bottom of said can rack, and the vertically extending portion 35 forming the back of the can rack. The bottom 34 and the back 35 are both corrugated lengthwise thereof, as will be evident from Figs. 1 and 4, and are formed from a single sheet of metal by bending the same substantially at right angles at 36. The longitudinal front edge of the bottom 34 is formed into a box flange 37, and the longitudinal top edge of the back 35 is formed into a box flange 38. Angle brackets 39 having the horizontal legs 40 and the vertical legs 41 are secured to the can rack, being secured to the bottom and back thereof in any preferred manner, such as by welding the flanges 42 thereof to the box flanges 37 and 38. Wooden filler members 43 and 44 are placed between the corrugated portions of the bottom and back portions of the can rack and the brackets 39, these serving both to make the bottom and back thereof stiffer by supporting the corrugations and also act as sound deadening means between the can rack and the main tank body.

End wall forming portions 45 are secured to the back portion 35 and the bottom portion 34 and are preferably secured thereto by welding. Said end wall forming portions are preferably provided with flanges 46 that extend around the edge of the bottom 34 and have angles 47 welded thereto at 50, said angles being welded to the corrugated bottom at 48 the angles being cut out to fit the corrugations in the bottom. The end wall portions 45 are further provided with flanges 49, which are welded to the rear of the corrugated back 35. One of the end wall forming portions of each rack is shown as being provided with the curved portion 51 and all said end portions have front wall portions 52 integral therewith. The tops of the end wall and front wall portions are provided with a doubled flange portion 53, extending around the curved portion 51 to finish off said edge, and the front wall portions 52 are each provided with an inwardly directed flange 54, (see Fig. 8), and a doubled flange portion 55 extending at right angles thereto, to form a door stop on said front portions, said doubled flange portion terminating in a flange 56 lying against the back of the flange 54.

The can rack is provided with a door 57 having the box flanges 58 and 59 extending along the top and bottom edges thereof, and box flanges 60 extending along the end of the door. Hinge pins 61 are welded to the door 57 on the inside of the box flange 59 and are pivotally mounted in the hinge eyes 62 provided on the inner sides of the wall portions 52, hinging the door to the can rack. Any suitable means such as the latch 63 having the bolt 64 may be provided for holding the door 57 in closed position, and the latch may be operated by any suitable means such as the chain 65 extending through eye 67.

The can rack is supported on the wings 30 on the extensions of the sheets 21 and 21' by securing the vertical portions 41 of the brackets 39 thereto by means of the bolts 66. The can racks are thus detachably mounted on the tank. While a certain length can rack is shown in the drawings corresponding in length to two sections of the main tank, it is, of course, to be understood that the length of the can rack may be increased or decreased, as long as the length of the can rack corresponds to the length of one or more of the sections of the main tank so as to fit between extended portions of the transverse sheets forming the partitions and end walls of the tank. The resulting can rack is very pleasing in appearance, as the door is flush with the front wall thereof, and none of the corrugations are visible from the ground, and in view of the rounded corners between the front and end walls thereof.

The barrel carrier 24 is mounted in a similar way on the main tank portion, and comprises a main body portion 70 forming the back of the barrel carrier and having integral side portions 71 connected therewith by means of the curved portions 72. The back forming portion 70 thereof is inclined, as shown in Fig. 6 and may be provided with corrugations 73, if desired, and a flange 74 may extend around the top edge of the said body portion. The bottom 75 is welded to the body portion 70 at 76, and is inclined toward the back of the barrel carrier, as will be evident from Fig. 6. The bottom 75 may be provided with a downturned flange 77 along the front edge thereof, and this flange may be bent around a stiffening angle 78 and said flange and angle welded to each other, said angle being welded to the under side of the bottom. The brackets 79 are welded to the sides 71 of the body portion, and have rearward extensions 80 that are bolted to the wings 30 on the sheets 21 and 21'. The edges of the sides 71 are flanged around the brackets 79 at 81.

The extensions 80 of the brackets are secured to the wings 30 on the transverse sheets 21 and 21' by means of the bolts 82 and 66, whereby the barrel carrier is detachably mounted firmly in position on the main tank, and is supported by the transverse sheets forming partitions and end walls thereof. A chain 83 engageable with a hook 84 is provided for holding the barrel in position in the carrier.

In the arrangement shown, the tank vehicle is further provided with the supplemental tank 25 which comprises a shell portion 90, shown in Figs. 1, and 5 as being curved to a substantially cylindrical contour, and having the transverse sheets 91 welded thereto at 92, said sheets 91 forming the heads of said tank 25. The sheets 91 are provided with integral lateral extensions 93 thereon, similar to the lateral extensions or wings 30 on the main tank. Said wings or extensions 93 may be provided with stiffening flanges or gussets 94, and said extensions 93 are secured to said wings or extensions 30 by means of the bolts 95 and 66 to detachably mount said supplemental tank 25 firmly and rigidly directly on the main tank portion by supporting the same on the transverse sheets 21 and 21'. The supplemental tank 25 may be provided with a filler collar 96 closed by means of the filler plug 97, and has a faucet 98 thereon for dispensing the contents thereof.

It is of course to be understood that various forms and shapes of supplemental tanks may be provided, and one other form is shown in Fig. 10, in which the supplemental tank is shown as being provided with curved top and bottom portions 99 and 100 and straight side portions 101, the transverse sheets 91' being correspondingly shaped, but having the wings or extensions 93' thereon corresponding to the extensions 93 on the sheets 91 for attachment to the wings 30 on the main tank portion, suitable holes 102 being provided for reception of the bolts for securing the same to said wings. The tank shown in Fig. 10 is provided with a filler collar 96' and filler plug 97' and a faucet 98'.

Each compartment of the main tank is provided with a dome 103 provided with the filler plug 104, and with a discharge pipe 105, the pipes 105 extending through the downward extensions 28 on the transverse sheets and being secured thereto, as by welding.

Having thus described my invention, what I claim and desire to secure by United States Letters Patent is:

1. In a tank vehicle, a tank comprising shell portions and transverse sheets, said sheets being extended laterally beyond said shell portions at the maximum transverse diameter of said shell portions to form vertically elongated ears extending laterally from the side of said tank and a can rack connected with said ears to mount the same along the side of said tank, at a point spaced above the bottom thereof.

2. In a tank vehicle, a tank having a curved body portion, vertically elongated attaching means integral with said tank extending laterally beyond the side of said body portion at its portion of maximum transverse diameter and supplemental carrying means secured to said attaching means to mount the same on the side of said tank at a point spaced above the bottom thereof.

3. In a tank, a body portion comprising transverse sheets and a shell, said sheets extending downwardly from said shell to provide supports under said tank and extending sidewise from said shell to provide integral attaching brackets on the sides of said tank, said sheets having integral bracing portions exteriorly of said shell extending between said bracket forming portions and said downwardly extending portions and having inclined edge portions.

4. In a tank vehicle, a tank body portion curved trasversely and having ears extending laterally from the side portion thereof at the widest portion of said tank, a can rack and a barrel carrier having flanges thereon secured directly to said ears to mount the same directly on said tank body portion to be supported thereby, one of said ears carrying both said can rack with said barrel carrier.

5. In a tank vehicle, a tank body portion curved transversely and having ears extending laterally from the curved side portion thereof, a can rack and a supplemental tank secured directly to said ears to mount the same directly on said tank body portion to be supported thereby, one of said ears carrying both said can rack and supplemental tank.

6. In a tank vehicle, a tank, securing means on said tank and a barrel carrier comprising a body portion having securing ears extending rearwardly therefrom, said body portion comprising a back and a bottom, and said ears being connected with said securing means on said tank and inclined relative to said body portion to mount said carrier on said vehicle with the bottom thereof inclining downwardly toward said back.

7. In a tank vehicle, a can rack having an integral corrugated sheet metal bottom and back, said back having a box flange along the top thereof and said bottom having a box flange along the forward edge thereof, front and end wall forming portions secured to said back and bottom forming portion and a door on said can rack.

8. In a tank vehicle, a can rack having an integral corrugated sheet metal bottom and back, end and front wall forming portions secured thereto and extending below the bottom of said corrugations and a sheet metal door hinged to said front wall portions and extending below the bottom of said corrugations.

9. In a tank vehicle, a can rack having an integral longitudinally corrugated sheet metal bottom and back, an uncorrugated end and front wall forming portion secured to said bottom and back and having a curved portion connecting the front wall and end wall portion thereof, and a sheet metal door flush with said front wall portion in closed position.

10. In a tank, a body portion having a transversely curved shell, vertically elongated ears extending laterally from and beyond the portion of maximum transverse diameter of said shell and depending below said portion of maximum transverse diameter and supplemental carrying means secured to said ears at a point laterally outwardly beyond the widest portion of said body portion and at a point spaced above the bottom of said tank.

11. In a tank vehicle, a main tank body comprising shell portions shaped to provide a portion of maximum transverse diameter above the bottom of said tank body and transverse sheets, said sheets being extended laterally beyond said shell portions at said portion of maximum transverse dimension of said tank body to provide vertically elongated laterally extending ears on said main tank body and a supplemental tank having a shell portion and transverse sheets joined to said shell portion and extending laterally beyond said supplemental tank shell to provide vertically extending lateral ears on said supplemental tank, and means for securing said ears on said main and supplemental tanks together to mount said supplemental tank on the side of said main tank body.

12. In a tank vehicle, a tank having laterally extending vertically elongated ears thereon at the side thereof, a barrel carrier having a body portion substantially U-shaped in horizontal section and having a pair of vertical side flanges thereon extending rearwardly from the rear wall of said body portion and means for securing said flanges to said ears.

13. In a tank vehicle, a can rack having an integral sheet metal bottom and back, front and end wall forming portions, a sheet metal door, and pivot members, for pivotally mounting said door on said can rack, projecting from said front wall forming portions toward said door.

14. In a tank vehicle, a can rack having an integral sheet metal bottom and back, front and end wall forming portions, a sheet metal door and pivot members for pivotally mounting said door on said can rack projecting from said front wall forming portions toward said door, said door having vertical box flanges at the ends thereof having openings therein receiving said pivot members.

15. In a tank vehicle, a sheet metal can rack having a back, bottom, end walls and a door for the front thereof, brackets angular in cross section extending under the bottom and along the back of said can rack for securing said rack to said vehicle, and sound deadening filler members between said brackets and said bottom and back.

16. In a tank vehicle, a sheet metal can rack having a back, bottom, end walls, front wall portions and a door hinged thereto, said front wall portions having inwardly directed flanges thereon adjacent said door terminating in doubled back portions forming stop flanges for said door.

17. In a tank vehicle, a tank having a transversely curved body portion, vertically extending flanges integral with said tank extending from the side of said body portion at its portion of maximum transverse diameter, a can rack having a back and vertically extending means extending rearwardly from the back of said can rack, and means for securing said vertically extending means to said flanges to mount said can rack closely adjacent said tank.

In testimony whereof, I hereunto subscribe my name this 16th day of March, 1929.

ANDREW A. KRAMER.